United States Patent [19]
Halldorsson et al.

[11] Patent Number: 4,914,284
[45] Date of Patent: Apr. 3, 1990

[54] OPTICAL WIDE ANGLE SENSOR HEAD

[75] Inventors: Thorstein Halldorsson; Konrad Altmann, both of Munich; Ernst-August Seiffarth, Taufkirchen, all of Fed. Rep. of Germany

[73] Assignee: Messerschmitt-Boelkow-Blohm GmbH, Munich, Fed. Rep. of Germany

[21] Appl. No.: 262,480

[22] Filed: Oct. 25, 1988

[30] Foreign Application Priority Data

Oct. 29, 1987 [DE] Fed. Rep. of Germany ....... 3736616

[51] Int. Cl.$^4$ .............................. G01J 1/20; H01J 5/16
[52] U.S. Cl. ............................ 250/206.2; 250/227.29
[58] Field of Search ................. 250/203 R, 216, 227, 250/221; 356/141, 152; 350/96.18

[56] References Cited

U.S. PATENT DOCUMENTS

| 3,897,151 | 7/1975 | Lecroy | 356/141 |
| 4,397,559 | 8/1983 | Gatewood | 250/203 R |
| 4,447,718 | 5/1984 | Mori | 250/203 R |
| 4,491,727 | 1/1985 | Appelbaum et al. | 250/203 R |
| 4,634,272 | 1/1987 | Endo | 356/152 |
| 4,693,602 | 9/1987 | Wyatt et al. | 250/227 |
| 4,729,621 | 3/1988 | Edelman | 350/96.18 |
| 4,798,444 | 1/1989 | McLean | 350/96.18 |

FOREIGN PATENT DOCUMENTS 0114053 10/1985 European Pat. Off. .
3323828 1/1986 Fed. Rep. of Germany .
3525518 10/1987 Fed. Rep. of Germany .

Primary Examiner—David C. Nelms
Assistant Examiner—Michael Messinger
Attorney, Agent, or Firm—W. G. Fasse; D. H. Kane, Jr.

[57] ABSTRACT

An optical wide angle sensor head for directionally sensing optical radiation is made of a plurality of individual sensor optical elements. Each sensor optical element is arranged at an input end of its own fiber optical conductor and has its own light entrance, its own field of view and its own individual optical axis. Neighboring fields of view may overlap each other. The fiber optical conductors lead to a transducer for converting the individual light signals into respective electrical signals. The individual sensor optical elements are arranged on a common mounting member in a housing so that the individual optical axes pass through a common intersection in front of said light entrances. The mounting member is a flat plate or a concave plate having a concave curvature facing in the viewing direction, whereby a spherical mounting is avoided.

16 Claims, 5 Drawing Sheets

OPTICAL WIDE ANGLE SENSOR HEAD

FIELD OF THE INVENTION

The invention relates to an optical wide angle sensor head. More specifically, such heads sense optical radiation in a directional manner by means of a plurality of individual optics having partially overlapping fields of view. The output of each sensor optic is connected through an optical fiber to a transducer for converting the light signals into respective electrical signals.

DESCRIPTION OF THE PRIOR ART

For many purposes for which optical systems are used, it is necessary that these systems have an extremely wide angle receptivity. For certain purposes, the receptivity or ability to see must have a 360° azimuth range and an elevational range of up to 180°. Such requirement must especially be met by sensors used for certain monitoring and warning purposes. The occurrence that must result in the generation of a warning signal may, for example, be the entry of an object or body into a space that is being monitored and such entry may happen over a large angular range anywhere within the monitored space. Conventional objectives of target acquisition and camera systems with a field of view less than 50° are insufficient for the optical viewing or reception over such large angular ranges. Using conventional wide angle objectives or even super wide angle objectives having fields of view of up to 110° has the disadvantage that such objectives are complex and correspondingly expensive. Another disadvantage of such conventional objectives is seen in the troublesome image distortion over the field of view and in the necessary rigid construction of the objective and of the detector in one image plane.

To avoid the just mentioned disadvantages optical sensor heads have been developed, having a plurality of so-called facet eyes each having an optical axis, whereby the eyes are so arranged that each optical axis is oriented in another direction. The viewing field of the individual facet eyes is sufficiently large so that with a mutual overlap the entire angular range can be viewed without gaps. In order to construct the opto-electrical transducer independently of the optical structure the transducer is connected to each facet eye by means of a flexible light conductor fiber for transmitting the optical signal from the facet eye to the transducer. Such a transducer is described in European patent publication EP No. 0,114,053. Disclosing a spherical sensor head having a surface to which a plurality of light conductors are attached in an even distribution over the hemispherical surface. The opposite ends of the light conductors are combined into a strand having an output facing surface connected to a detector matrix forming the transducer by means of a plurality of detector elements arranged in the form of said matrix. The matrix is connected to an evaluating circuit which allocates the detectors to the individual fiber light conductors, whereby the direction of the incoming radiation is ascertained. German patent publication (DE-PS) No. 3,323,828 and German patent publication (DE-PS) No. 3,525,518 disclose laser warning sensors having sensor heads formed by individual lenses arranged on a spherical surface. These individual lenses together with the respective individual light conductor fibers form so-called facet eyes having a defined field of view. The pupil width in such laser warning sensors is obtained by means of a fixed positioning of the entrance surface of the light conductor end out of the focal plane of the respective focal plane of the corresponding lens.

In these known conventional sensors the sensor optics are arranged with reference to a common coordinate origin of a three-dimensional coordinate system so that all optical axes pass through the center of the spherical mounting surface, said center forming said coordinate origin. It has been found that the just described conventional sensors have certain disadvantages in connection with certain types of uses and under different operating conditions. For example, the sensor head with its spherical mounting surface for the individual facet eyes projects unavoidably out of the surface of the supporting system such as a flying body, a tank wall, a helicopter wall, and so forth. On the one hand, this projection disturbs the aerodynamic characteristics of the carrier if a flying body is involved. On the other hand, the useful life of the sensor is diminished by its exposed position, especially on a tank which must drive through obstacles such as a forest or the like.

Furthermore, due to its outwardly vaulted or convex optical reception surface, the sensor head is hardly at all protected against stray radiation and reflected radiation. Such radiation may originate outside the actual reception range of the sensor, for example on the outer skin of the sensor carrier. However, due to its intensity such radiation may enter at least partially into one of the individual eyes due to multiple reflection of the stray radiation.

Yet another structural disadvantage is seen in that the conventional spherical mounting surface must be relatively large, especially if the mounting is accomplished with ferrules or plug-in sockets located on the inside of the spherical mounting surface of the sensor head. Due to the orientation of the individual optical axes, these mounting ferrules or sockets are all directed toward the center of the spherical surface, whereby the spacing between neighboring eyes on the spherical surface becomes relatively large in order to provide sufficient space for the mounting inside the sphere. This requirement is incompatible with the further requirement that the weight and volume of the sensor head should be as small as possible. Another disadvantage of a large eye spacing on the surface of the mounting sphere is seen in that such spacing between individual eyes may become larger than the size of the scintallation cells that is the light/ dark structure across a laser beam cross-section which, in the atmosphere, is normally within the range of a few millimeters up to centimeters. This fact makes it difficult to obtain an angle interpolation of the optical signals of several individual eyes. To avoid this problem the spacings between neighboring individual eyes should be maximally within the range of a few millimeters.

Still another disadvantage of the spherical form of the sensor head is seen in the need for a protective glass cover hood which also must have a spherical configuration. These spherical hoods are not only costly, they are also hard to clean, especially by automatic cleaning means.

OBJECTS OF THE INVENTION

In view of the foregoing it is the aim of the invention to achieve the following objects singly or in combination:

to construct an optical wide angle sensor head of the type mentioned above which substantially avoids the problems and disadvantages of the prior art;

to substantially simplify the physical configuration of such sensor heads so that they may be essentially flat; and to construct such sensor heads that they are less trouble-prone and less susceptible to interferences.

SUMMARY OF THE INVENTION

An optical wide angle sensor head according to the invention is characterized in that the individual optics or optical elements are arranged on a mounting plate in such a way that the common intersection of all optical axes is located in front of the light entrance openings of these individual optics or optical elements.

Due to this feature it is possible that the light entrance openings may be located closely spaced from one another while still providing sufficient space behind the mounting plate for the ferrules mounted in the common mounting plate. The mounting plate may be flat or concave so that it will not project outside the surface to which the sensor head is attached.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
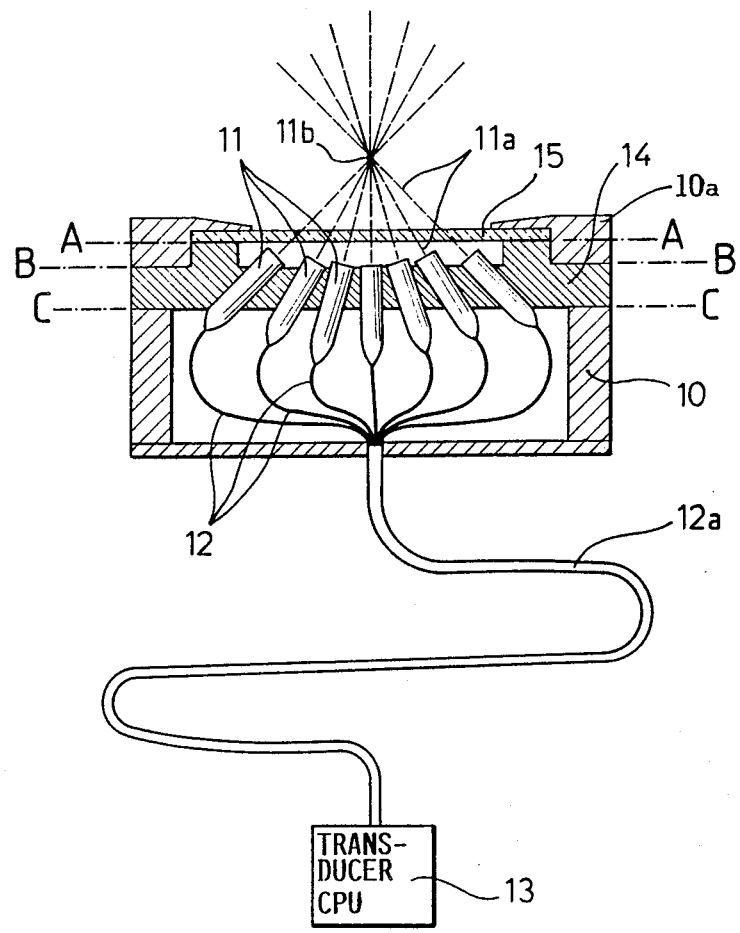
FIG. 1 is a sectional view through a first example embodiment of a sensor head according to the invention having a wide angle receptivity and facet eyes, whereby the sectional plane extends substantially perpendicularly to the mounting plate.
Figure 2A:
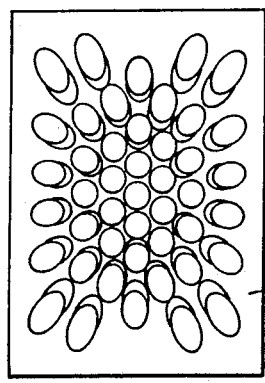
FIG. 2a is a view substantially in a direction toward the plane A—A shown in FIG. 1 and illustrating a plan view of a cover window of the sensor head having imprinted thereon an aperture pattern.
Figure 2B:
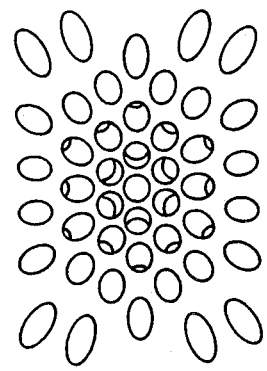
FIG. 2b is a view substantially along section plane B—B shown in FIG. 1, whereby the individual optics or optical elements are shown sectioned inside the sensor head.
Figure 2C:
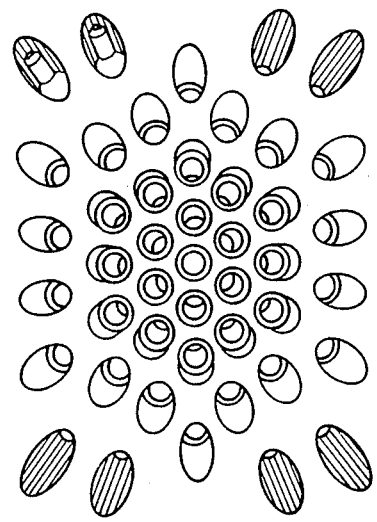
FIG. 2c is a sectional view along section line C—C partially revealing the individual fiber light conductors.

FIG. 1 shows an example embodiment of a directional optical sensor head 10 according to the invention which comprises a plane mounting plate 14 having slanted holes therein for mounting individual optics 11 also referred to as optical elements 11 or sensor elements. Each optical element 11 has its own optical axis 11a. According to the invention the direction of all the optical axes 11a is so oriented that they have a common intersection 11b. This intersection 11b forms the origin of a three-dimensional rectangular coordinate system. Thus, this intersection is no longer located inside a sphere, but may be located outside the head. As best seen in FIGS. 2a, 2b, and 2c the sensor head is equipped with seven rows of individual optical elements 11 which have a mutual spacing from one another in the azimuth direction of 15°. The optical axes 11a are angularly and equally spaced from one another by 17.3°. Assuming that the received signal is attenuated by about 33% a viewing field of about 20° for each optical element 11 has been found to be sufficient for assuring a continuous, gapless, uniform reception over an angular range of 90° by 90°.

However, for applications requiring a larger receptivity range for example 180° or even 360°, it is easy to assemble several individual sensor heads since the individual fiber light conductors are sufficiently flexible so as to not cause any problems. The flat installation of several such heads, for example, in a carrier forming part of a tank or flying body also does not pose any problems. The output signals of the individual optical elements 11 of all sensor heads 10 can be processed by a central electronic signal processing unit 13 connected to the individual optical elements 11 by fiber light conductors 12 a fiber optical cable 12a. The CPU 13 includes transducers for converting individual light signals into respective electrical signals.

Figures 4A, 4B, 4C:
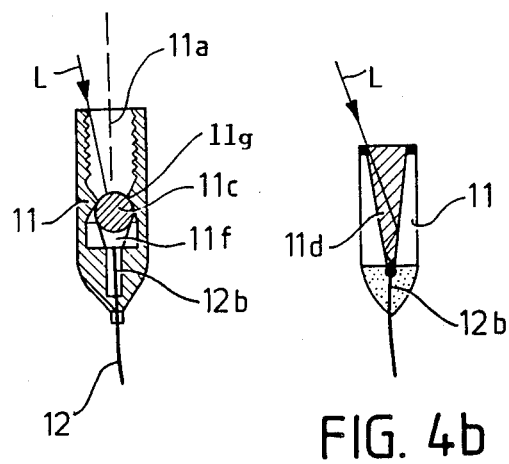
FIG. 4a is a sectional view through an embodiment of an individual optic, or optical element, or facet eye with a spherical lens.
FIG. 4b is a view similar to that of FIG. 4a, but showing a funnel-type wave guide of solid material forming the optic or optical element or facet eye.
FIG. 4c is a view similar to that of FIGS. 4a or 4b, but showing a funnel type wave guide made as an open sleeve with a conical configuration.

As shown in FIGS. 4a to 4c, the positioning or defining of the field of view and of the pupil width of each individual optical element 11 can be accomplished with different types of input optical elements such as a spherical lens 11c shown in FIG. 4a, or a solid material light conductor wave guide member 11d shown in FIG. 4b or a hollow sleeve type light conductor wave guide member 11e shown in FIG. 4c.

Referring specifically to FIGS. 4a, 4b, and 4c, each light conductor 12 has an end portion 12b having a light entrance end face positioned to receive light from the respective optical member 11c or 11d or 11e. In FIG. 4a the spherical lens 11c is mounted on a holder 11f and held in place by a restriction 11g in the inner diameter of the optical element 11. The spherical lens 11c is so positioned that it directs the incoming light L into the end face of the end portion 12b of the light conductor 12. The spherical lens 11c has a light collecting effect, whereby the pupil width is enlarged. However, simultaneously the field of view or the acceptance angle of the facet eye is reduced compared to the original field of view of the numerical aperture of the light conductor fiber. The reduction in the field of view is determined by a value which is in turn determined by the spacing of the entrance end face of the light conductor fiber end 12b from the focal plane of the spherical lens 11c.

In order to suppress radiation components entering due to multiple reflections into the spherical lens, or due to stray light coming from angular ranges outside of the normal field of view of the light conducting fiber 12, the spherical lens 11c is mounted on the holder 11f which is constructed as a so-called baffle tube.

In FIG. 4b the individual optical element 11 is formed primarily by a so-called cone-shaped funnel wave guide 11d made of solid light conducting material and held in place so that its cone tip introduces its light into the facing end surface of the light conductor fiber end 12b. The angle of the cone, its length, and its base diameter are selected in such a manner that the light beams coming from a defined angular range are introduced into the light conductor fiber end 12b due to total reflection within the cone. This embodiment is also capable of increasing the size of the pupil width and to reduce the acceptance angle of the individual optic.

FIG. 4c shows a funnel type wave guide formed as a hollow sleeve 11e having an inner mirror reflecting surface, whereby the light L is reflected into the tip of the hollow sleeve and thus introduced into the light conductor end 12b.

By placing the common intersection 11b of the optical axes 11a in front of the light entrances of the optical elements 11 so that the origin of the coordinate system is also located in front of the sensor head, and by the convergence of the optical axes 11a to this intersection 11b, it is now possible that the light entrances or light entrance openings are located very close to each other while still providing sufficient space behind the mounting plate 14 for the arrangement of any mounting ferrules in the common mounting plate 14. Another substantial advantage of this construction is seen in the fact that the cover window 15 can now be flat.

The embodiments shown in FIGS. 4b and 4c have several advantages. One advantage is seen in that disturbances due to lens errors are avoided. Another advantage resides in the fact that disturbing radiation and multiple reflections are substantially eliminated making the sensor head immume relative to such undesirable light inputs. All embodiments of the optics 11 permit a very compact construction of the entire facet eye assembly. In order to assemble several individual sensor heads into sensor units it is very important that each individual sensor head has a compact structure to permit an interpolation of the signals coming from several neighboring sensor heads viewing a turbulent atmosphere.

Figure 3A:
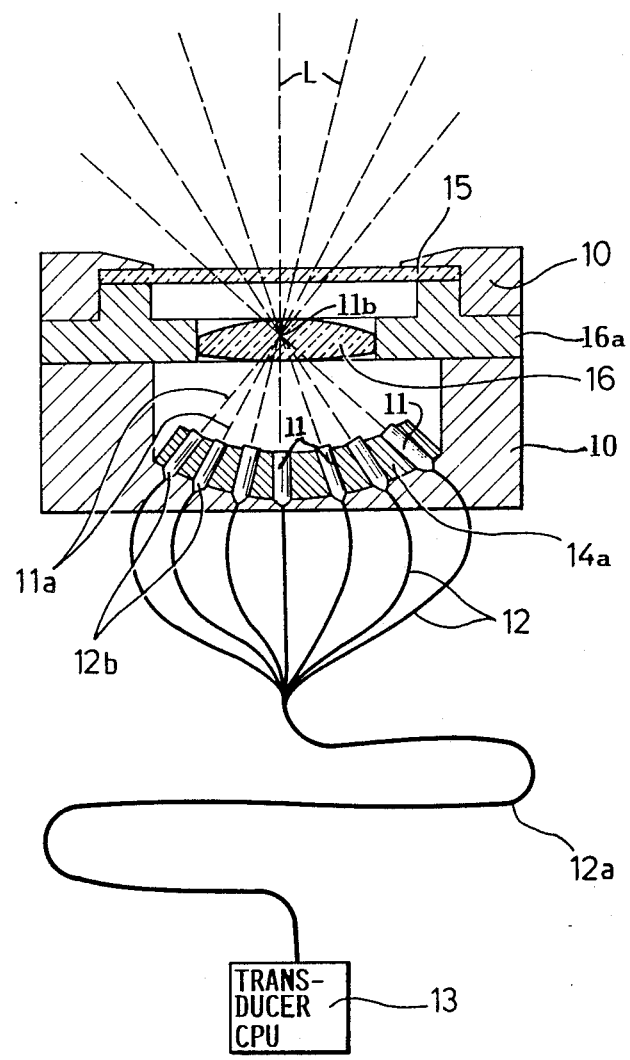
FIG. 3a is a sectional view similar to that of FIG. 1, but showing a modified embodiment of the invention with a concave mounting plate and a common lens optic for the individual optics or optical elements, whereby an intersection of the optical axes is inside said common lens.
Figure 3B:
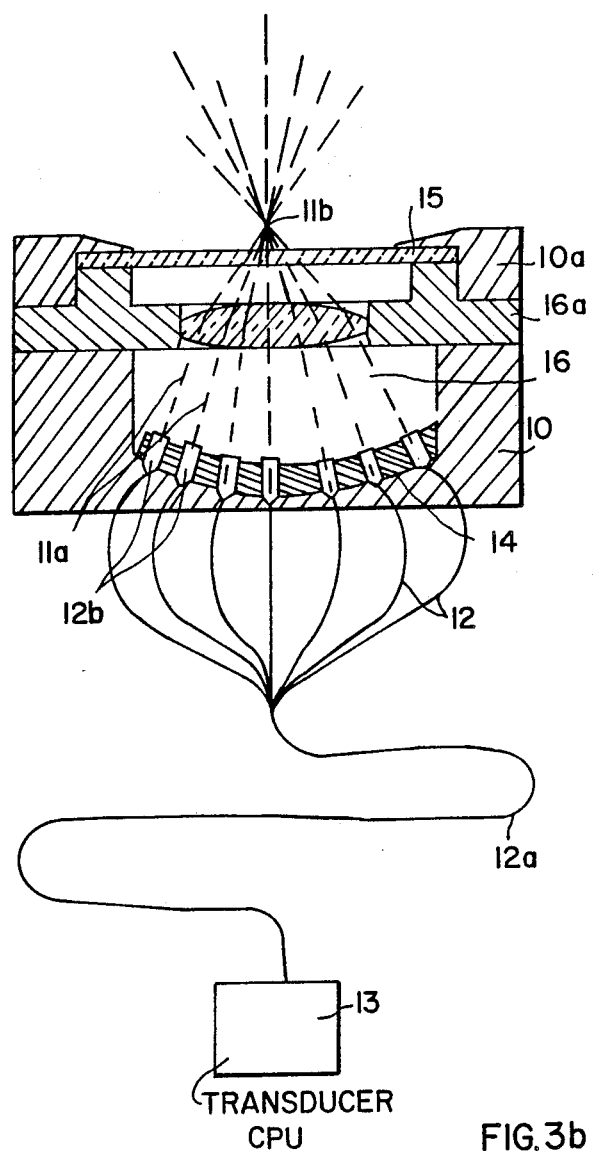
FIG. 3b is a view similar to that of FIG. 3a with an intersection of the optical axes outside said common lens.

FIGS. 3a and 3b illustrates further example embodiments of a sensor head according to the invention comprising a common lens 16 forming a so-called input optic for all optical elements 11 which in the simplest embodiment may be increased diameter end portions 12b of the fiber light conductors 12. These optical elements 11 are mounted in a concavely curved mounting plate 14a, the concave curvature of which faces in the light receiving direction. The optical members 11 are again oriented so that the optical axis 11a have a common intersection 11b which may be located in the lens 16 mounted in its own lens holder 16a, as shown in FIG. 3a. The optical elements 11 are arranged in a uniform geometrical distribution as, for example, shown in FIGS. 2a, 2b, an 2c and the optical axis 11a all have the same slant, or rather the same axial orientation. The slide concave curvature of the mounting plate 14a assures a correction of the image curvature. By a suitable selection of the focal width of the lens 16 and its diameter, as well as a suitable arrangement of the light conductor fiber ends 12b or rather optical elements 11, it is possible to provide viewing fields of which the neighboring viewing fields partially overlap one another, thereby providing a gapless continuous receptivity over a determined spacial angular range. The lens 16 may be a spherical lens or a cylindrical lens, whereby again an especially simple construction is achieved. The light entrances of the optics 11 are then located on a spherical surface, the center of which coincides with the center of the lens 16 and with the common intersection 11b. However, it is also possible that the common intersection 11b is located outside the lens 16, as shown in FIG. 3b.

In FIGS. 1, 3a, and 3b, the housing 10 has a threaded ring 10a which holds the viewing window 15 in place. The fiber light conductors 12 are formed into a light conductor cable 12a connecting the sensor head 10 to the central processor 13.

Although the invention has been described with reference to specific example embodiments, it will be appreciated, that it is intended to cover all modifications and equivalents within the scope of the appended claims.

We claim:

1. An optical wide angle sensor head for directionally sensing optical radiation, comprising housing means for mounting said sensor head, a plurality of individual optical elements (11) for said sensing, each optical element having its own light entrance and field of view and its individual optical axis, and means for mounting said individual optical elements in said housing means in such positions, that said individual optical axes converge in an intersection (11b) forming an origin of a three-dimensional coordinate system as a reference system of said wide angle sensor head, said intersection (11b) being located upstream of said light entrances as viewed in a direction of incident light entering said light entrances.

2. The sensor head of claim 1, wherein said means for mounting comprise a substantially flat plate with slanted bores therein for holding said individual optical elements.

3. The sensor head of claim 1, wherein said means for mounting comprise a curved mounting plate having a concave curvature relative to said common intersection, and bores in said curved mounting plate for holding said individual optical elements.

4. The sensor head of claim 1, wherein at least neighboring fields of view of said optical elements partially overlap each other.

5. The sensor head of claim 1, further comprising transducer means for converting light signals into electrical signals, an individual light conductor for each optic, each individual light conductor having a light input end surface operatively connected to its optical elements and a light output end operatively connected to said transducer means.

6. The sensor head of claim 5, wherein each of said optical elements comprises a spherical lens and a holder for locating each spherical lens in front of said light input end surface of the respective individual light conductor for defining the field of view and pupil width of the respective individual optical elements.

7. The sensor head of claim 5, wherein each of said optical elements comprises a cone shaped funnel type wave guide member and a holder for locating each wave guide member in front of said light input end surface of the respective individual light conductor for defining the field of view and pupil width of the respective individual optical element.

8. The sensor head of claim 7, wherein said cone shaped funnel type wave guide member is made of solid light conducting material.

9. The sensor head of claim 5, wherein each of said optical elements comprises a cone shaped sleeve having an inner mirror surface and a holder for locating each cone shaped sleeve in front of said light input end surface of the respective individual light conductor for defining the field of view and pupil width of the respective individual optical element.

10. The sensor head of claim 1, wherein said housing means comprise a plane cover window located in front of said individual optical elements as viewed in the view direction, said plane cover window having an aperture pattern imprinted thereon.

11. The sensor of claim 10, further comprising lens means arranged in said housing means in common for all of said individual optical elements, said lens means being located between said plane cover window and said means for mounting said individual optical elements.

12. The sensor of claim 1, further comprising lens means arranged in said housing means upstream of said light entrances as viewed in a direction of incident light entering said light entrances, said lens means being provided in common for all of said individual optical elements for gathering said optical radiation and feeding said optical radiation to said light entrances.

13. The sensor of claim 12, wherein said intersection is located inside said lens means arranged in common for all of said individual optical elements.

14. The sensor of claim 12, wherein said intersection is located upstream of said lens means as viewed in a direction of incident light entering said lens means.

15. The sensor of claim 1, wherein said intersection is located outside said housing means.

16. The sensor of claim 1, wherein each of said individual optical elements comprises an end of a fiber light conductor.

* * * * *